United States Patent [19]

Terabayashi

[11] 4,345,352

[45] Aug. 24, 1982

[54] WINDOW WIPER FOR VEHICLE

[75] Inventor: Gosaku Terabayashi, Okazaki, Japan

[73] Assignee: Toyota Jidosha Kogyo Kabushiki Kaisha, Toyota, Japan

[21] Appl. No.: 186,266

[22] Filed: Sep. 11, 1980

[30] Foreign Application Priority Data

Sep. 15, 1979 [JP] Japan .......................... 54-127100[U]

[51] Int. Cl.³ ................................................ B60S 1/04
[52] U.S. Cl. ................................ 15/250.16; 15/250.19; 15/250.32
[58] Field of Search ........... 15/250.16, 250.17, 250.19, 15/250.35, 250.32

[56] References Cited

U.S. PATENT DOCUMENTS

| 2,284,844 | 6/1942 | Rappl | 15/250.19 |
| 3,019,468 | 2/1962 | Hatch | 15/250.19 |
| 4,040,141 | 8/1977 | O'Steen | 15/250.16 |

Primary Examiner—Peter Feldman
Attorney, Agent, or Firm—Cushman, Darby & Cushman

[57] ABSTRACT

A window wiper for a vehicle comprises a wiper blade, holding a blade rubber, a wiper arm connected to the wiper blade, a wiper operating means for operating the wiper arm and the wiper blade to wipe a wind sealed glass of the vehicle, a slide member projecting from the central portion of the wiper blade into a downward wiping direction and a guide member having a stop portion provided on the lower edge of the wind sealed glass at a position corresponding to the slide member.

When the wiper is stopped, the wiper blade moves downwards to its stopped position and the slide member slides along the guide member to be mounted thereon and is stopped by the stopper portion of the guide member.

As a result, the wiper blade is lifted up by the guide member at its stopped position and the blade rubber is not pressed against the wind sealed glass.

4 Claims, 3 Drawing Figures

WINDOW WIPER FOR VEHICLE

BACKGROUND OF THE PRESENT INVENTION

The present invention relates to a window wiper for a vehicle, particularly to a window wiper of which wiper blade is stopped at a predetermined position on the lower portion of a wind sealed glass and is supported in a lifted condition thereat.

When the wiper is stopped on the lower portion of the wind sealed glass, a blade rubber is bent in a downward wiping condition and pressed against the wind sealed glass or a wind sealed moulding which is provided along the lower periphery of the wind sealed glass.

And at the same time when the wiper is started again, the blade rubber is turned and bent in the reverse direction and the wiper proceeds to an upward wiping process. The blade rubber becomes permanently deformed while the wiper is stopped with the blade rubber bent for a long time on the lower periphery of the wind sealed glass.

Therefore, the blade rubber is not smoothly turned in the reverse direction at the restarting of the upward wiping process and it is apt to be damaged.

Particularly, in the window glass provided with the wind sealed moulding on the lower periphery thereof, on which the blade rubber is stopped, the blade rubber is pressed against the wind sealed moulding more strongly, and the above described problems are more serious.

These problems can be prevented by lifting the wiper blade when it is stopped, and making the pressing force applied to the blade rubber small.

According to one of the conventional means for lifting the wiper blade, the wiper blade is lifted up in the base portion of a wiper arm.

But, in this device, the lifting distance of the wiper blade which is connected to an end of the wiper arm is apt to be scattered largely.

When the lifting distance is too small, the pressing force of the blade rubber cannot be decreased sufficiently. And when the lifting distance is too large, the wiper blade is not supported stably and also it is apt to touch with other parts of the vehicle body and things outside thereof.

Furthermore, in the above described conventional device, it is difficult to properly adjust the lifting distance in accordance with the type and the setting position of the wiper, and the curvature of the wind sealed glass.

Accordingly, one object of the present invention is to provide a window wiper for a vehicle which is smoothly started and exhibits excellent durability by lifting the wiper blade at its stopped position and keeping the pressing force of the blade rubber small.

Another object of the present invention is to provide a wiper having a wiper blade supporting means which smoothly lifts the wiper blade at its stopped position to a proper height and stably supports it.

Still another object of the present invention is to provide a wiper blade supporting means which is widely applicable to window sealed glasses of different curvatures and window wipers of different types and different setting positions.

DESCRIPTION OF THE DRAWINGS

Other objects and advantages of the invention will become apparent from the following description of embodiments with reference to the accompanying drawings wherein.

SUMMARY OF THE INVENTION

The wiper of the present invention achieves the above described objects by providing a slide member in the wiper blade and providing a guide member on the lower edge of the wind sealed glass at a position corresponding to the slide member when the wiper blade is to be stopped, for guiding and sliding the slide member.

DETAILED DESCRIPTION OF THE INVENTION

Hereinafter, an embodiment of the present invention will be explained with reference to the accompanied drawings.

Figure 1:
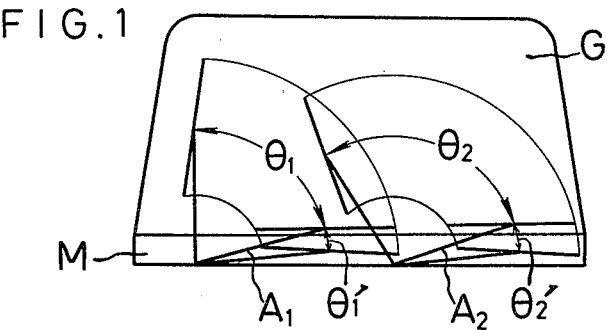
FIG. 1 is an explanatory schematic view showing the wiping pattern of the window wiper.

FIG 1 is an explanatory view of the wiping pattern of the wiper. G designates a front wind sealed glass of a vehicle and $A_1$ and $A_2$ designate wipers on the right and left side of the glass, respectively.

$\theta_1$ and $\theta_2$ show wiping angles of the wipers $A_1$ and $A_2$, respectively. M designates a lower portion of a wind sealed moulding attached to the outer periphery of the wind sealed glass G. After the downward wiping process, the wipers $A_1$ and $A_2$ further move downwards along the surface of the wind sealed moulding by predetermined angles $\theta_1'$ and $\theta_2'$ and then, they are stopped.

Figure 2:
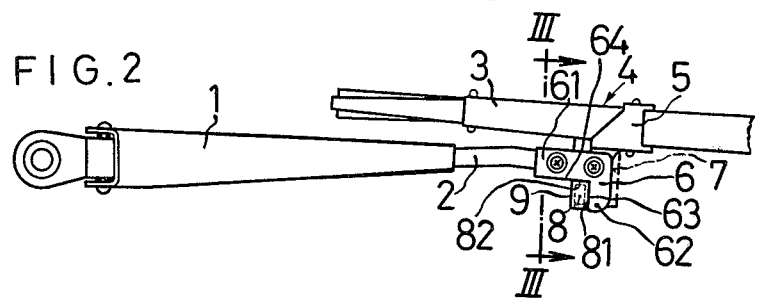
FIG. 2 is a plan view of the window wiper of the present invention.
Figure 3:
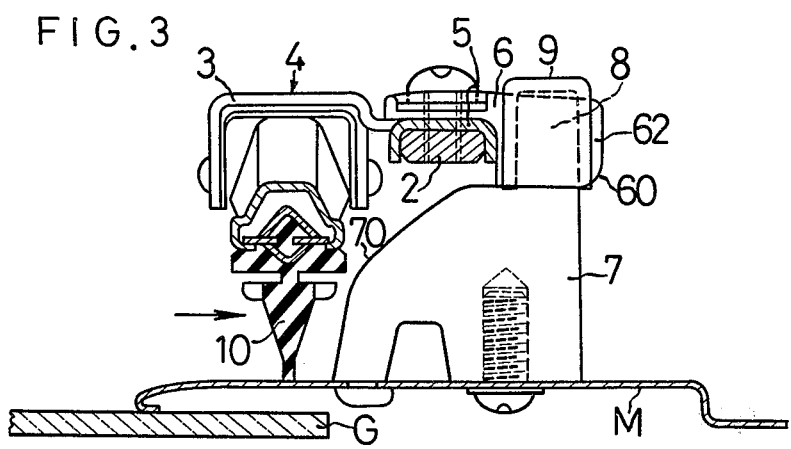
FIG. 3 is an enlarged cross-sectional view taken along the line III—III of FIG. 2.

In an embodiment shown in FIG. 2 and FIG. 3, one end of an arm retainer 1 is pivotally connected to a link mechanism (not shown) which is operated by a wiper motor provided with a device for automatically stopping the wiper at a predetermined position.

And to the other end thereof, an arm piece 2 is fixedly connected. A blade retainer 3 which retains a blade rubber 10 is rockably supported by a holder 5 in the central portion thereof. And the holder 5 and the arm piece 2 are connected with each other by means of a slide member 6 so that the arm piece 2 and the blade retainer 3 are nearly parallel with each other.

The slide member 6 is formed of hard rubber or synthetic resin and shaped like a letter L having two projecting ends 61, and 62. One projecting end 61 of the slide member 6 extends parallel with the blade retainer 3 and is connected with the arm piece 2. And the other projecting end 62 extends in a direction perpendicular to the blade retainer 3. The projecting end 62 is thicker than the projecting end 61 and the bottom corner of the projecting end 62 forms a smooth curved surface 60.

To a wind sealed moulding M which is attached along the lower edge of a front glass G, a guide member 7 formed of hard rubber or synthetic resin is fixed by means of a screw and by welding at a position corresponding to the slide member 6 of the wiper blade 4.

In the upper surface of the guide member 7, facing to the wiper blade 4 (left side in FIG. 3), a smooth inclined surface 70, which guides and slides the slide member 6, is formed and a stop portion 8 projects from one part of the top surface of the guide member 7. The stop portion 8 is covered with a covering member 9 formed of soft rubber or synthetic resin. The stop portion 8 is formed at such a position that the side surface 63 of the projecting end 62 of the slide member 6 is slidably contacted with one side surface 81 of the stop portion 8.

In operation of the window wiper having such a structure as described above, the wiper blades 4 reciprocate within the angular ranges $\theta_1$ and $\theta_2$, (FIG. 1), wiping the front glass G by means of the blade rubber 10 thereof.

And when the wiper motor is cut off, the wiper blade 4 and the blade rubber 10 further move downwards along the wind sealed moulding M in a direction as indicated by an arrow in FIG. 3 after the downward wiping process.

At this time, the curved surface 60 formed in the bottom corner of the slide member 6 is contacted with the inclined surface 70 of the guide member 7 and slides up therealong. As a result, the wiper blade 4 and the blade rubber 10 are lifted up.

When the slide member 6 moves further along the inclined surface 70 and is on the top surface of the guide member 7, one side surface 63 of the projecting end 62 of the slide member 6 is contacted with the side surface 81 of the stop portion 8 which is covered with the covering member 9 and slides therealong. And then another side surface 64 of the projecting end 61 of the slide member 6 is contacted with the side surface 82 of the stopper portion 8 and is stopped.

As a result, the wiper blade 4 is stopped by the stop portion 8 of the guide member 7.

In the above described embodiment, the guide member 7 is fixed to the wind sealed moulding M which is attached in the lower edge of the glass G. The guide member 7 can be also attached to the glass surface directly, in the vehicle without any wind sealed moulding in the lower periphery of the glass.

Furthermore, the wiper of the present invention can be also employed in other glasses than the front wind sealed glass.

The wiper of the present invention has operation effects as described below.

Namely, since the wiper blade is lifted up at its stopped position and supported so that the blade rubber is lightly contacted with the moulding or the glass, any permanent deformation is not generated while the wiper is stopped, and the wiper smoothly starts to the upward wiping process without turning of the blade rubber in a reverse direction.

And since the blade rubber is supported in the central portion thereof with good balance, the blade rubber is prevented from being pressed against the window sealed moulding or glass locally at its stopped position.

In addition, the lifting distance of the wiper blade can be properly adjusted with ease by changing the shape of the guide member in accordance with the type and setting position of the wiper, and the curvature of the glass.

Furthermore, since the guide member is provided with the stop member covered with soft rubber, the wiper blade is stopped at a predetermined position without generating any shocking sound and is positively supported at such a position.

The wiper supporting means of the present invention can be widely applicable regardless of differences in type and setting position of the wiper and curvature of the wind sealed glass by making the projecting end of the slide member which slides up along the guide member, sufficiently long.

Having now fully described the invention, it will be apparent to one of ordinary skill in the art that many changes and modifications can be made thereto without departing from the spirit or scope of the invention as set forth herein.

What is claimed is:

1. A window wiper for wiping the glass of a windshield of a vehicle comprising:
   a wiper blade which is positioned along and adjacent the lower edge of said windshield glass when said wiper is stopped and at rest;
   a wiper arm oscillational about a transverse axis at one end thereof;
   a blade holder connected to the other end of said arm and rockably supporting the central portion of said wiper blade to that side of said arm which faces upwardly when said wiper is at rest;
   a slide member fixedly mounted to said blade holder and having a portion on the other side of said arm projecting toward said windshield glass, that surface of said portion opposed to said glass being smooth and having a convexly curved edge which is lowermost when said wiper is at rest; and
   a fixed guide member adjacent the lower edge of said windshield glass at a position engageable by said projecting portion when said wiper blade moves to its rest position, the surface of said guide member opposed to said projecting portion being inclined for camming engagement with said projecting portion to lift said wiper blade as the latter moves toward said rest position to minimize deformation of the wiping portion of said blade when in stopped position, and said guide member having a stop portion engageable by said slide member for stopping downward movement of said wiper blade at a predetermined position of rest 2. The structure defined in claim 1 wherein the slide member is generally L-shaped with one arm thereof generally parallel to said one end of said wiper arm and overlying the blade holder and the other arm thereof generally perpendicular to said wiper blade and extending downwardly therefrom when said wiper is at rest, the projecting portion of said slide member being formed on said other arm.

3. The structure defined in claim 2 wherein the stop portion is adjacent the inclined surface of the guide member at a position wherein the other arm of the slide member slides along a side surface of said stop portion and the one arm engages another side surface of said stop portion for stopping downward movement of the wiper blade at the predetermined position.

4. A window wiper according to claim 2, wherein:
   said guide member is integrally formed of hard rubber or hard synthetic resin; and
   said stop portion is covered with a covering member formed of soft rubber or soft synthetic resin.

* * * * *